(12) United States Patent
Bacon et al.

(10) Patent No.: US 11,554,475 B2
(45) Date of Patent: *Jan. 17, 2023

(54) MULTI-TOOL

(71) Applicant: WOLF TOOTH COMPONENTS, LLC, Burnsville, MN (US)

(72) Inventors: Anthony C. Bacon, Minneapolis, MN (US); Jonathan E. Rosemeier, Prior Lake, MN (US); Michael W. Pfeiffer, Eden Prairie, MN (US)

(73) Assignee: Wolf Tooth Components, LLC, Burnsville, MN (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/135,955

(22) Filed: Dec. 28, 2020

(65) Prior Publication Data

US 2021/0197348 A1   Jul. 1, 2021

Related U.S. Application Data

(60) Provisional application No. 62/953,892, filed on Dec. 26, 2019.

(51) Int. Cl.
| | |
|---|---|
| B25B 27/00 | (2006.01) |
| B21L 21/00 | (2006.01) |
| B29C 73/08 | (2006.01) |
| B25F 1/02 | (2006.01) |
| B25F 5/02 | (2006.01) |
| B62K 21/12 | (2006.01) |
| B62J 11/22 | (2020.01) |
| B25G 1/08 | (2006.01) |
| B62J 9/40 | (2020.01) |
| B62J 9/21 | (2020.01) |

(Continued)

(52) U.S. Cl.
CPC ............ *B25F 1/02* (2013.01); *B21L 21/00* (2013.01); *B25B 27/0071* (2013.01); *B25F 5/029* (2013.01); *B25G 1/085* (2013.01); *B29C 73/08* (2013.01); *B62J 9/21* (2020.02); *B62J 9/40* (2020.02); *B62J 11/22* (2020.02); *B62K 21/12* (2013.01); *B62K 21/26* (2013.01); *B25B 15/00* (2013.01)

(58) Field of Classification Search
None
See application file for complete search history.

(56) References Cited

U.S. PATENT DOCUMENTS

| | | |
|---|---|---|
| D340,172 S | 10/1993 | Her |
| D376,084 S | 12/1996 | Karvinen |
| 5,615,587 A | 4/1997 | Foerster, Jr. |

(Continued)

OTHER PUBLICATIONS

All In Multitool, retrieved Feb. 28, 2020, 4 pages, <https://www.allinmultitool.co.uk/products/all-in-multitool>.
All In Multitool V2—Black—With Chain Tool, retrieved Feb. 28, 2020, 4 pages, <https://www.allinmultitool.co.uk/products/all-in-multitool-v2-black>.

(Continued)

*Primary Examiner* — Brian D Keller
(74) *Attorney, Agent, or Firm* — Dicke, Billig & Czaja, PLLC

(57) ABSTRACT

A multi-tool includes a cylindrical body and a head extended from an end of the cylindrical body, the head to be pivoted between a first position with the head aligned with the cylindrical body and a second position with the head oriented at an angle to the cylindrical body, the head including a cradle to support a segment of a roller chain.

20 Claims, 12 Drawing Sheets

(51) Int. Cl.
    *B62K 21/26*     (2006.01)
    *B25B 15/00*     (2006.01)

(56) References Cited

U.S. PATENT DOCUMENTS

| | | | |
|---|---|---|---|
| D601,799 S | 10/2009 | Andre et al. | |
| 7,669,860 B2 | 3/2010 | Chiang | |
| 8,141,455 B2 | 3/2012 | Ogburn | |
| D659,730 S | 5/2012 | Cantlon | |
| D673,193 S | 12/2012 | Dickrede | |
| D679,811 S | 4/2013 | Hahn | |
| D694,406 S | 11/2013 | Hahn | |
| 9,463,559 B1 | 10/2016 | Chan | |
| D828,740 S | 9/2018 | Levand et al. | |
| D886,564 S | 6/2020 | Dittmer | |
| D886,565 S | 6/2020 | Hinkens | |
| D922,166 S | 6/2021 | Sawa | |
| 2003/0140744 A1 | 7/2003 | Chen | |
| 2005/0078480 A1* | 4/2005 | Xingguo | B25B 13/56 362/253 |
| 2015/0102567 A1 | 4/2015 | Chan | |
| 2019/0275651 A1 | 9/2019 | Dittmer | |
| 2021/0101266 A1* | 4/2021 | Gu | B25H 3/006 |
| 2021/0146641 A1* | 5/2021 | Chuang | B62J 11/22 |
| 2021/0170814 A1* | 6/2021 | Chuang | B29C 73/08 |

OTHER PUBLICATIONS

Barintool, retrieved Feb. 28, 2020, 11 pages, <https://www.barintool.com/product-page/small-package?lang=en>.

Mineral Design—Barstow System, retrieved Feb. 28, 2020, 7 pages, <http://www.mineralbikes.com/shop/barstow-system>.

Bikepacking.com, Bit Driver Muiti-Toois for Bikepacking and Bike Touring, The Low Down Gear Guide, retrieved Feb. 28, 2020, 13 pages, <https://bikepacking.com/gear/bit-driver-multi-tools/>.

Lezyne—T-Drive Bike Multi Tool Kit, retrieved Feb. 28, 2020, 8 pages, <https://ride.lezyne.com/collections/multi-tools/products/t-drive>.

Road.cc, 12 of the Best Multi Tools—Get the Right Bits to Fix your Bike's Bits, retrieved Feb. 28, 2020, 9 pages, <https://road.cc/content/buyers-guide/215058-12-best-multi-tools-get-right-bits-fix-your-bikes-bits>.

Granite Design—Stash Chain Tool, retrieved Feb. 28, 2020, 4 pages, <https://www.granite-design.com/stashchaintool>.

Granite Design—Stash Multi-Tool, retrieved Feb. 28, 2020, 4 pages, <https://www.granite-design.com/stashmultitool>.

Granite Design—Stash Tire Plug Kit, retrieved Feb. 28, 2020, 4 pages, <https://www.granite-design.com/stashtireplug>.

Topeak—Ninja C, retrieved Feb. 28, 2020, 5 pages, <https://www.topeak.com/global/en/products/ninja-series/102-ninja-c>.

* cited by examiner

MULTI-TOOL

CROSS-REFERENCE TO RELATED APPLICATIONS

This application claims priority under 35 U.S.C. 119(e) to U.S. Provisional Patent Application Ser. No. 62/953,892 filed on Dec. 26, 2019, and incorporated herein by reference. In this instance, the day that is 12 months after the filing date of the provisional application falls on a Saturday (i.e., Saturday, Dec. 26, 2020). As such, the period of pendency of the provisional application is extended to the next succeeding business day (i.e., Monday, Dec. 28, 2020). See 35 U.S.C. 119(e)(3).

BACKGROUND

The present disclosure relates generally to a multi-tool and, more specifically, relates to a multi-tool for use with a bicycle.

BRIEF DESCRIPTION OF THE DRAWINGS

Chain Break and Tire Plug Multi-Tool (200)

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure.

Chain Break and Tire Plug Multi-Tool (200)

Figure 1:
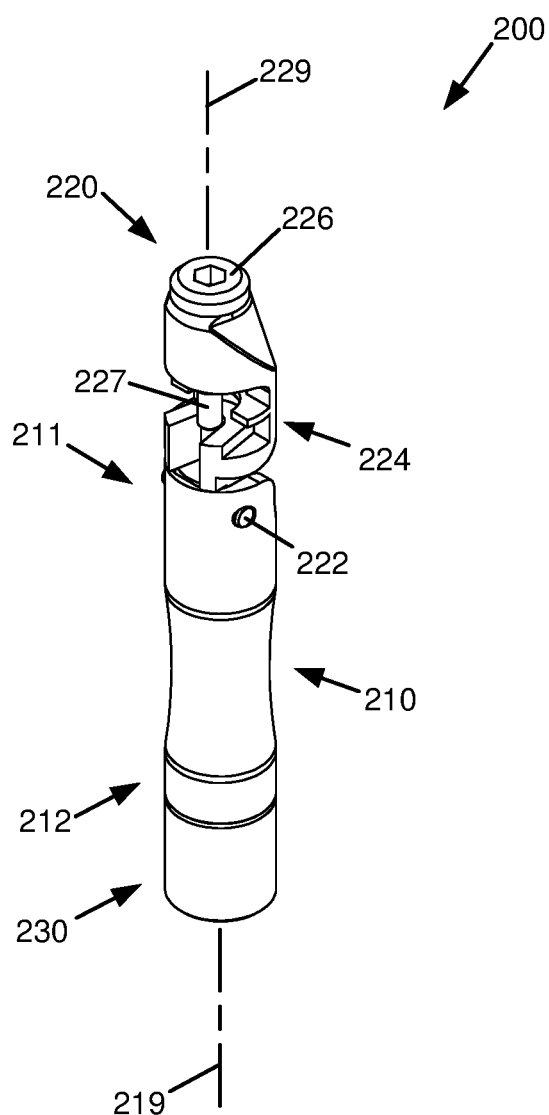
FIGS. 1 and 2 are perspective views of an example of a chain break and tire plug multi-tool, with a head of the chain break and tire plug multi-tool in a first position.
Figure 2:
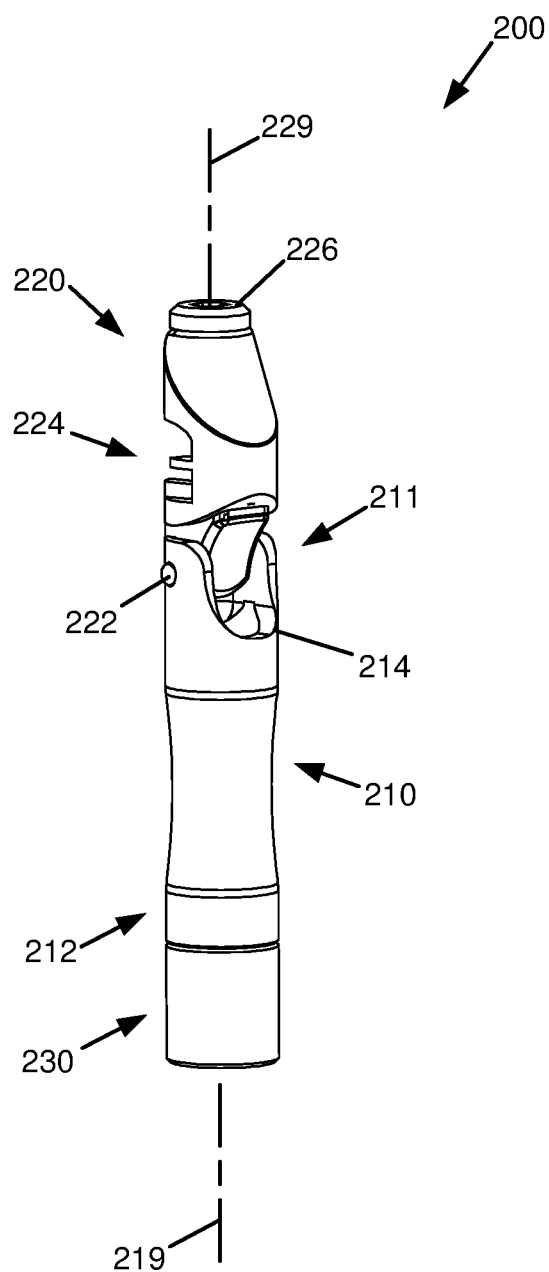
Figure 3:
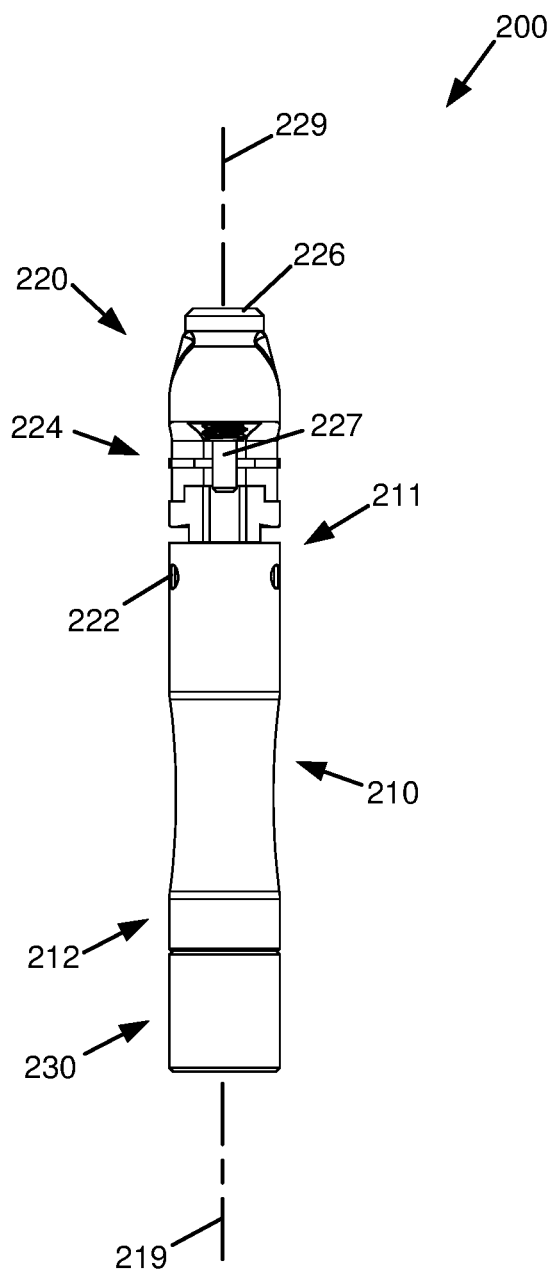
FIGS. 3, 4, 5, and 6 are elevation views of the chain break and tire plug multi-tool of FIG. 1.
Figure 4:
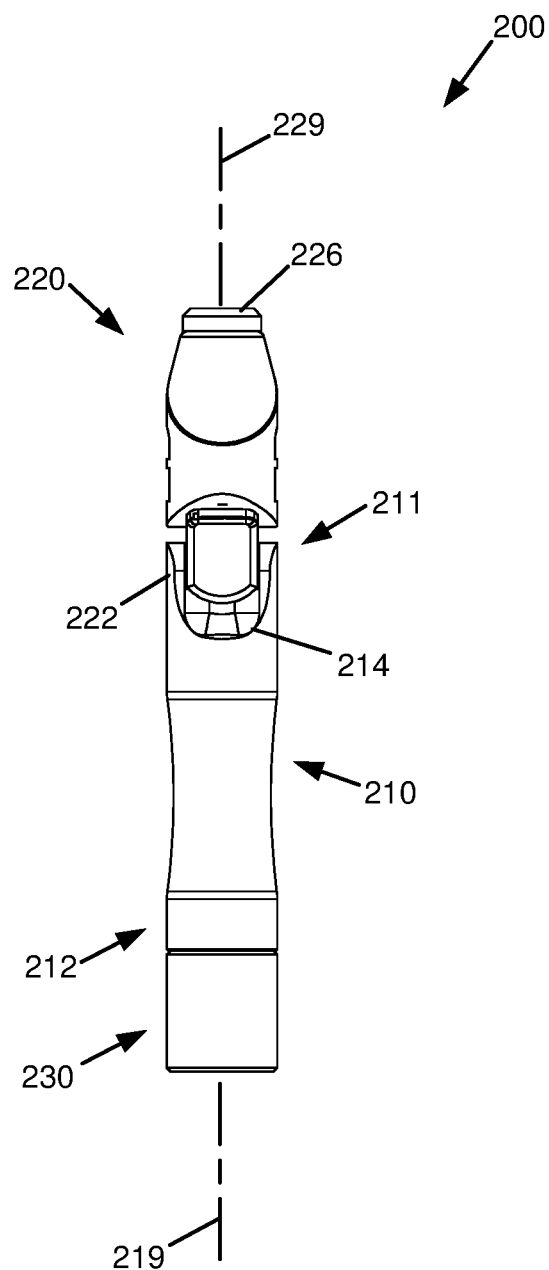
Figure 5:
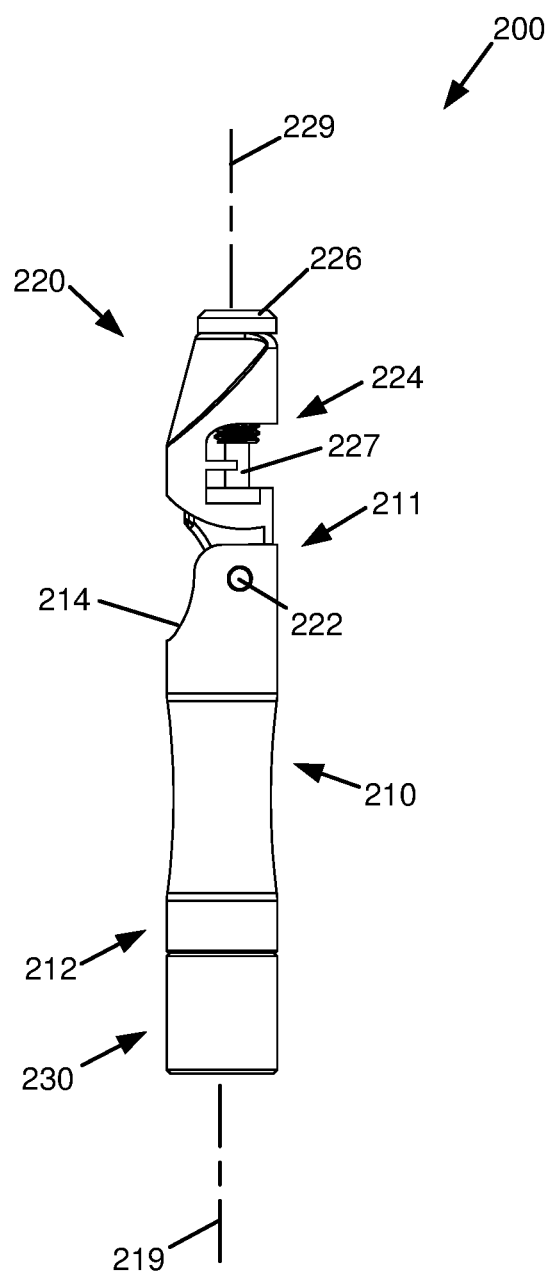
Figure 6:
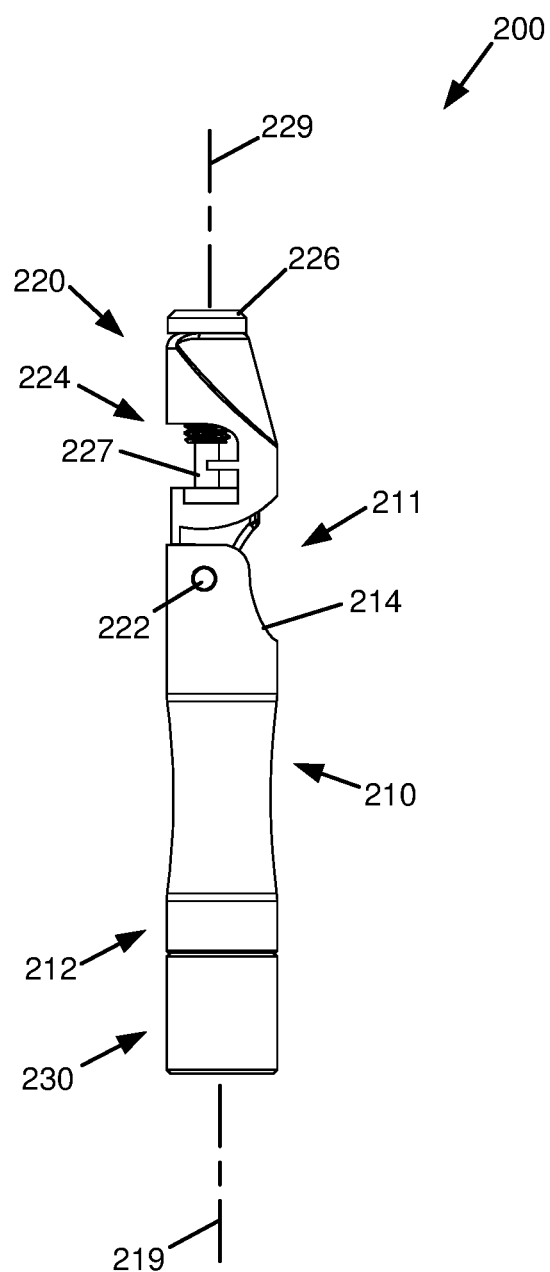

FIGS. 1 and 2 are perspective views of an example of a chain break and tire plug multi-tool, with a head of the chain break and tire plug multi-tool in a first position.

FIGS. 3, 4, 5, and 6 are elevation views of the chain break and tire plug multi-tool of FIG. 1.

Figure 7:
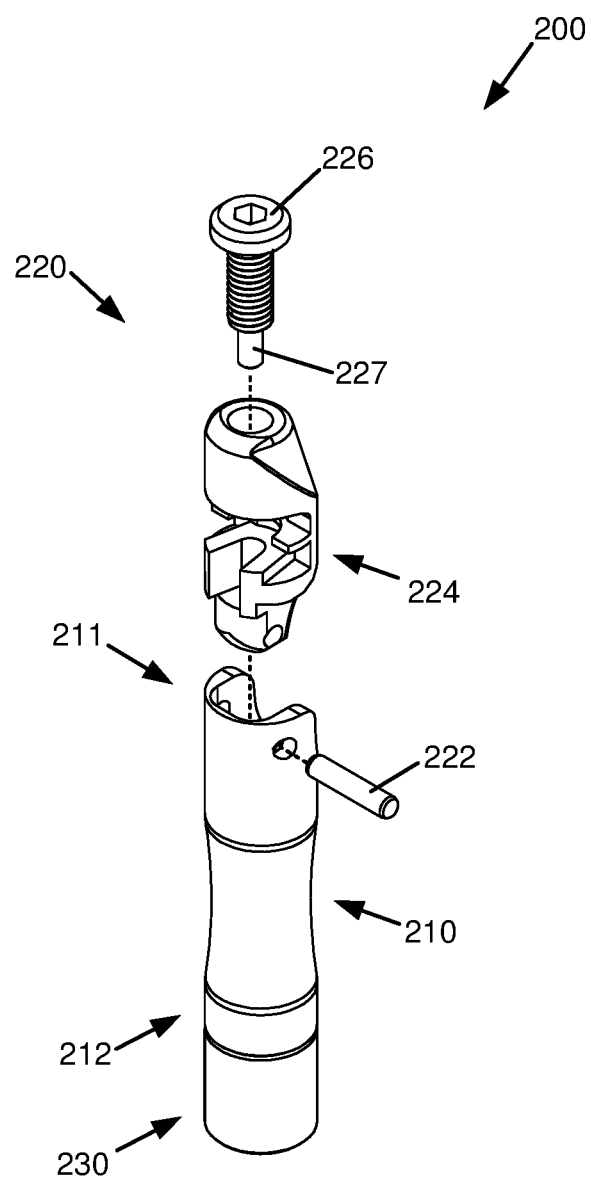
FIG. 7 is an exploded perspective view of the chain break and tire plug multi-tool of FIG. 1.

FIG. 7 is an exploded perspective view of the chain break and tire plug multi-tool of FIG. 1.

Figure 8:
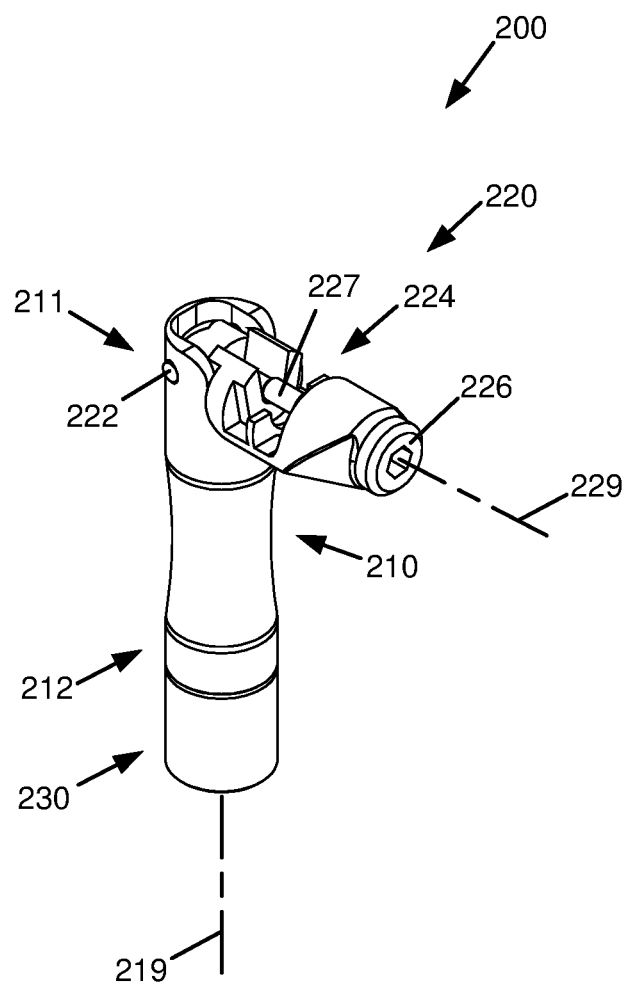
FIG. 8 is a perspective view of the chain break and tire plug multi-tool of FIG. 1, with the head of the chain break and tire plug multi-tool in a second position.

FIG. 8 is a perspective view of the chain break and tire plug multi-tool of FIG. 1, with the head of the chain break and tire plug multi-tool in a second position.

Figure 9:
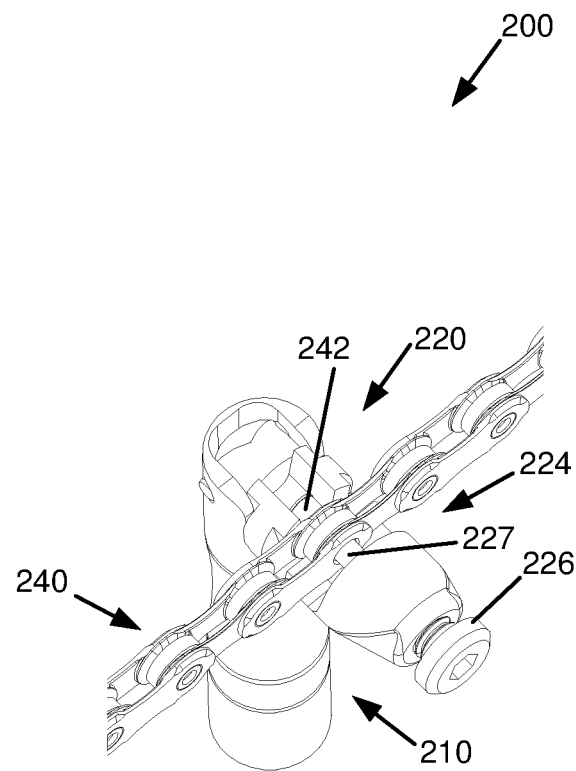
FIG. 9 illustrates an example of use of the chain break and tire plug multi-tool of FIG. 1.

FIG. 9 illustrates an example of use of the chain break and tire plug multi-tool of FIG. 1.

Figure 10A:
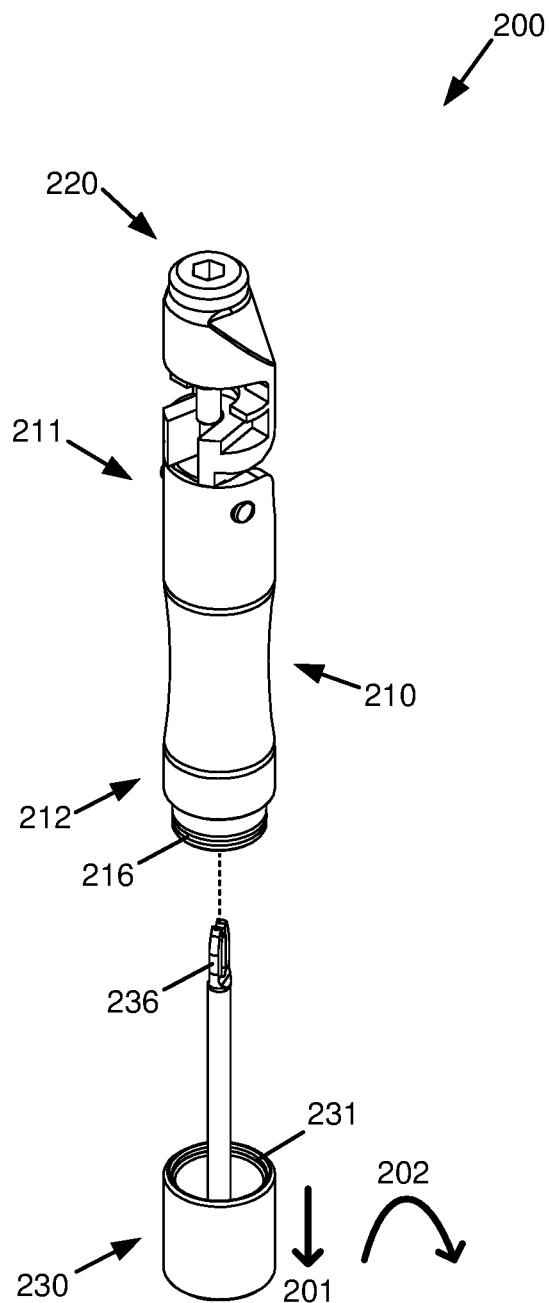
FIGS. 10A and 10B are exploded perspective views of the chain break and tire plug multi-tool of FIG. 1.
Figure 10B:
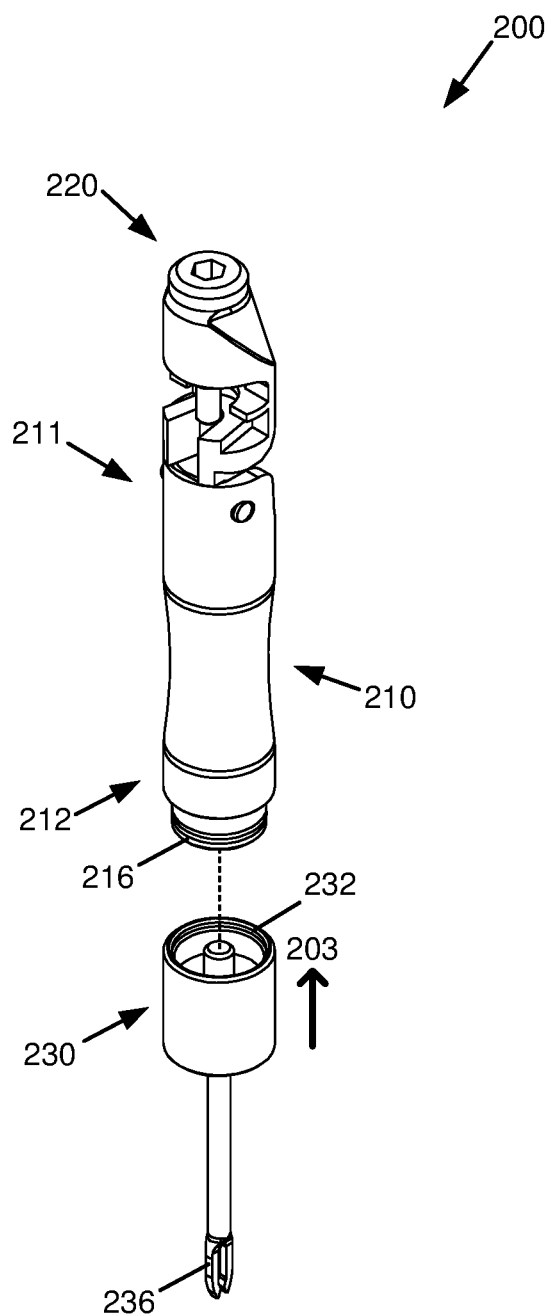

FIGS. 10A and 10B are exploded perspective views of the chain break and tire plug multi-tool of FIG. 1.

Figure 11:
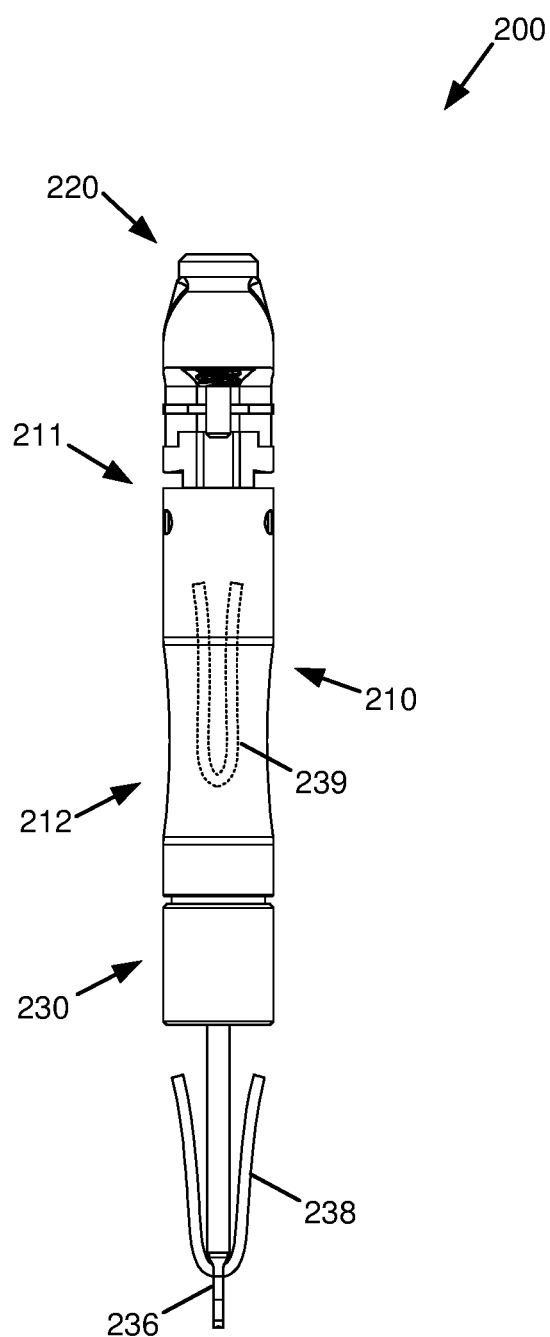
FIG. 11 illustrates an example of use of the chain break and tire plug multi-tool of FIG. 1.

FIG. 11 illustrates an example of use of the chain break and tire plug multi-tool of FIG. 1.

In one example, chain break and tire plug multi-tool 200 (referred to hereinafter as chain break 200) includes a cylindrical body 210 and a head 220 extended from body 210. More specifically, in one implementation, body 210 has a first end 211 and a second end 212, with head 220 provided at (adjacent or near) first end 211. In addition, in one implementation, a cap 230 is provided at second end 212 of body 210.

In one implementation, head 220 is pivotally or rotatably coupled with body 210 (for example, by a pin 222) such that head 220 may be pivoted or rotated between a first position (as illustrated, for example, in FIG. 2) and a second position (as illustrated, for example, in FIG. 8). In one example, in the first position, head 220 is aligned with body 210 such that an axis 229 of head 220 is parallel (substantially) with an axis 219 of body 210. In one example, in the second position, head 220 is oriented at an angle to body 210 such that axis 229 of head 220 is perpendicular (substantially) to axis 219 of body 210. In one implementation, body 210 includes a notch or undercut 214 at (adjacent or near) first end 211 to accommodate or receive and/or support head 220 when head 220 is pivoted or rotated to the second position.

In examples, the first position of head 220 represents a neutral position of head 220. In one implementation, with head 220 in the neutral position, chain break 200 may be stowed or stored, as disclosed herein. In examples, the second position of head 220 represents an operable position of head 220, as disclosed herein.

In the illustrated example, head 220 includes a cradle 224 to support a segment of a roller chain, and an extractor bolt 226 having a push pin or breaker pin 227 such that push pin or breaker pin 227 may be advanced (or retracted) with extractor bolt 226 to engage a link pin of a roller chain, as disclosed herein.

FIG. 9 illustrates an example of use of chain break 200. For example, chain break 200 may be used as a chain break tool. More specifically, as illustrated in the example of FIG. 9, a segment of a roller chain 240 may be positioned in cradle 224 of head 220 such that push pin or breaker pin 227 of extractor bolt 226 may engage a link pin 242 of roller chain 240 to extract (or insert) link pin 242. During use as a chain break tool, body 210 of chain break 200 may be held by a user as extractor bolt 226 is advanced (or retracted), for example, by a hex key wrench or hex insert bit.

In one example, as illustrated in FIG. 10A, cap 230 may be removed from body 210. As such, in examples, an interior of body 210 may be accessed. In one implementation, at least a portion of the interior of body 210 is hollow or open and provides a space for storage.

In one implementation, as illustrated in FIGS. 10A and 10B, a tire plug fork or inserter 236 extends from cap 230 such that cap 230 may be removed from body 210 (as represented, for example, by arrow 201), inverted (as represented, for example, by arrow 202), and re-coupled with body 210 (as represented, for example, by arrow 203) such that tire plug fork or inserter 236 extends from body 210, as illustrated in the example of FIG. 11. In one implementation, tire plug 238 (or an additional tire plug) may be stored within an interior of body 210, as represented by broken lines 239.

In one implementation, opposite ends of cap 230 include respective threads 231 (FIG. 10A) and threads 232 (FIG. 10B) that interchangeably mate with threads 216 provided at (adjacent or near) second end 212 of body 210. As such, threads 231 or threads 232 of cap 230 may be threadingly mated with threads 216 of body 210 to reversibly couple cap 230 with body 210 based on an orientation of cap 230.

FIG. 11 illustrates an example of use of chain break 200. For example, chain break 200 may be used to hold and insert a tire plug 238, for example, into a tire.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples disclosed herein.

What is claimed is:

1. A multi-tool, comprising:
a cylindrical body,
a head extended from an end of the cylindrical body, and
a cap provided at an opposite end of the cylindrical body,
the cap to be threadably coupled with the cylindrical body in a first orientation, removed from the cylindrical body, inverted to a second orientation, and threadably re-coupled with the cylindrical body in the second orientation,
the head to be pivoted between a first position with the head aligned with the cylindrical body and a second position with the head oriented at an angle to the cylindrical body,
the head including a cradle to support a segment of a roller chain.

2. The multi-tool of claim 1, the head including an extractor bolt having a push pin, the push pin to engage a link pin of the roller chain.

3. The multi-tool of claim 1, the cylindrical body including an undercut at the end thereof to accommodate the head when the head is pivoted to the second position.

4. The multi-tool of claim 1,
the cap to be removed from the cylindrical body to access an interior of the cylindrical body.

5. The multi-tool of claim 4, further comprising:
a tire plug fork extended from the cap.

6. The multi-tool of claim 5, when the cap is coupled with the cylindrical body in the first orientation, the tire plug fork to extend into the interior of the cylindrical body.

7. The multi-tool of claim 5, when the cap is inverted and re-coupled with the cylindrical body in the second orientation, the tire plug fork to extend from the cylindrical body.

8. The multi-tool of claim 4, further comprising:
a tire plug to be stored in the interior of the cylindrical body.

9. The multi-tool of claim 1, opposite ends of the cap each including threads that interchangeably mate with threads of the cylindrical body.

10. The multi-tool of claim 1, further comprising:
a tire plug fork extended from the cap.

11. The multi-tool of claim 10,
when the cap is coupled with the cylindrical body in the first orientation, the tire plug fork to extend into the cylindrical body, and
when the cap is re-coupled with the cylindrical body in the second orientation, the tire plug fork to extend from the cylindrical body.

12. A multi-tool, comprising:
a cylindrical body;
a head pivotally coupled with the cylindrical body at one end; and
a cap provided at an opposite end of the cylindrical body,
the head including a cradle to support a segment of a roller chain,
the cap to be reversibly coupled with the cylindrical body and having a tire plug inserter extended therefrom,
when the cap is reversibly coupled with the cylindrical body, the tire plug inserter to selectively extend into the cylindrical body and from the cylindrical body.

13. The multi-tool of claim 12, the head including an extractor bolt having a push pin, the push pin to engage a link pin of the roller chain.

14. The multi-tool of claim 12, further comprising:
the cap to be removed from the cylindrical body to access an interior of the cylindrical body.

15. The multi-tool of claim 14, the interior of the cylindrical body to store a tire plug.

16. The multi-tool of claim 12, the cap to be coupled with the cylindrical body in a first orientation, removed from the cylindrical body, inverted to a second orientation, and re-coupled with the cylindrical body in the second orientation.

17. The multi-tool of claim 16, when the cap is inverted and re-coupled with the cylindrical body in the second orientation, the tire plug inserter to extend from the cylindrical body.

18. The multi-tool of claim 16, when the cap is coupled with the cylindrical body in the first orientation, the tire plug inserter to extend into the cylindrical body.

19. The multi-tool of claim 12, the cap to be reversibly coupled with the cylindrical body based on an orientation of the cap.

20. The multi-tool of claim 12, opposite ends of the cap each including threads that interchangeably mate with threads of the cylindrical body.

* * * * *